United States Patent [19]

Crook

[11] Patent Number: 4,469,348
[45] Date of Patent: Sep. 4, 1984

[54] TRAILER TONGUE STAND

[76] Inventor: Richard D. Crook, 207 Edward St., Tallahasee, Fla. 32304

[21] Appl. No.: 481,393

[22] Filed: Apr. 1, 1983

[51] Int. Cl.³ .............................................. B60D 1/14
[52] U.S. Cl. .................................. 280/475; 280/763.1
[58] Field of Search .................... 280/475, 755, 763.1; 248/166, 163 R, 188.6, 352

[56] References Cited

U.S. PATENT DOCUMENTS

| | | | |
|---|---|---|---|
| 2,207,812 | 7/1940 | McClellan | 280/475 |
| 2,475,145 | 7/1949 | Krause et al. | 280/475 |
| 2,571,390 | 10/1951 | Strand | 280/475 |
| 2,631,862 | 3/1953 | Johnson | 280/475 |
| 2,865,658 | 12/1958 | Dubuque | 280/475 |
| 2,969,885 | 1/1961 | Lutz | 414/529 |
| 3,643,975 | 2/1972 | Parkhurst | 280/475 |
| 3,791,676 | 2/1974 | Spratlen | 280/475 |
| 3,989,276 | 11/1976 | Hamerl | 280/763.1 |
| 4,294,088 | 10/1981 | Barr | 70/56 |

Primary Examiner—Joseph F. Peters, Jr.
Assistant Examiner—D. Lynn Fugate
Attorney, Agent, or Firm—Harvey B. Jacobson

[57] ABSTRACT

A downwardly opening inverted channel is provided for mounting to the underside of a trailer tongue with the channel extending longitudinally of the tongue. The channel includes a pair of depending opposite side flanges interconnected along the upper marginal edges by a bight portion extending therebetween and a generally U-shaped leg assembly including upstanding legs interconnected at their lower ends by a horizontal cross piece has the upper ends of first and second legs thereof pivotally supported from the outer sides of first and second flanges, respectively, of the channel by first and second pivot structures for angular displacement of the U-shaped leg assembly relative to the channel about substantially aligned axes extending transversely of the channel. The leg assembly is swingable between a downwardly extended depending and slightly downwardly and forwardly inclined position and a rearwardly projecting upwardly retracted horizontal position. The channel includes abutment structure engageable by the leg assembly to limit swinging movement toward the extended position and the channel includes detent structure engageable by one of the legs for releasably retaining the leg assembly in the downwardly extended position as well as the upwardly retracted position.

7 Claims, 4 Drawing Figures

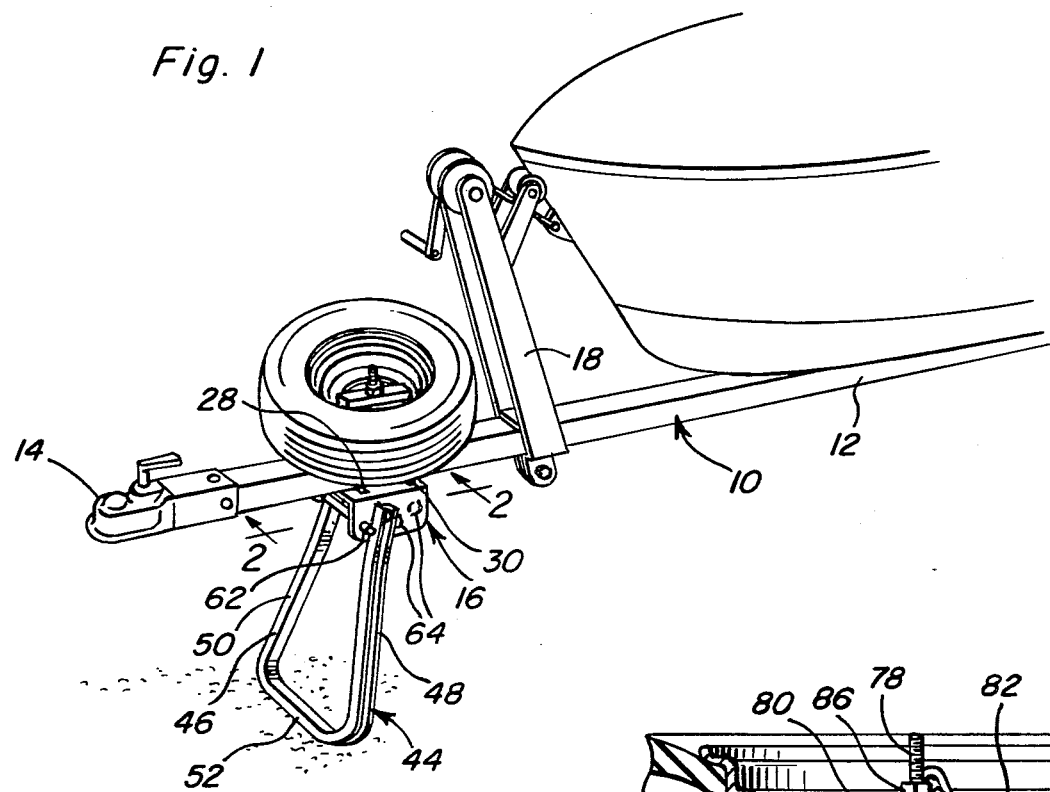
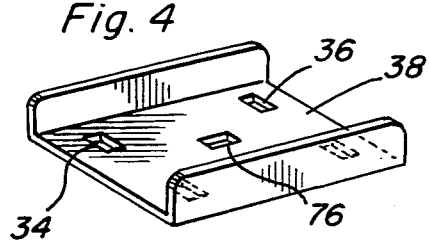
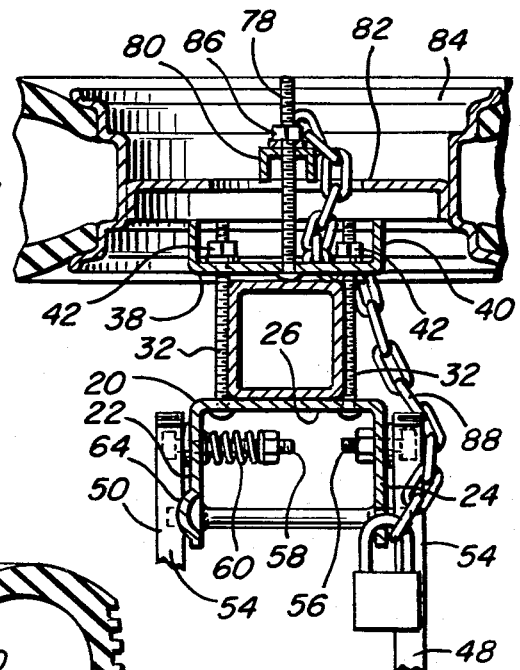
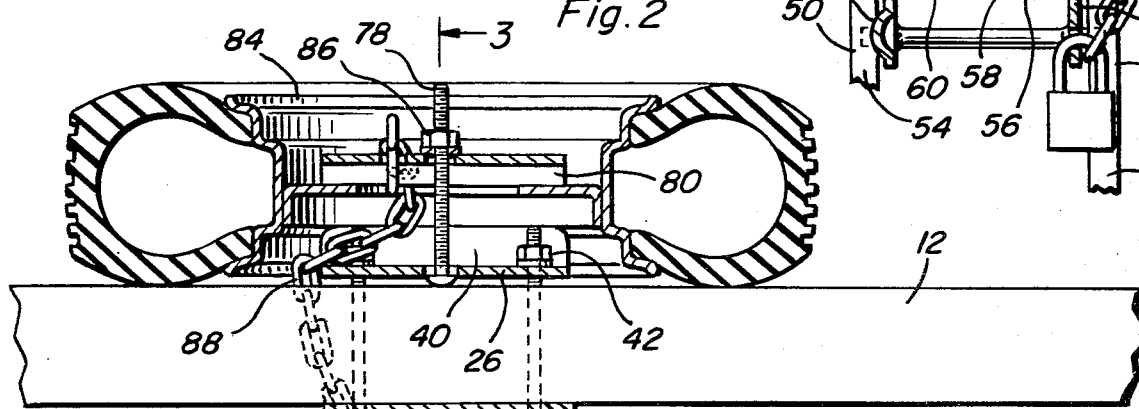
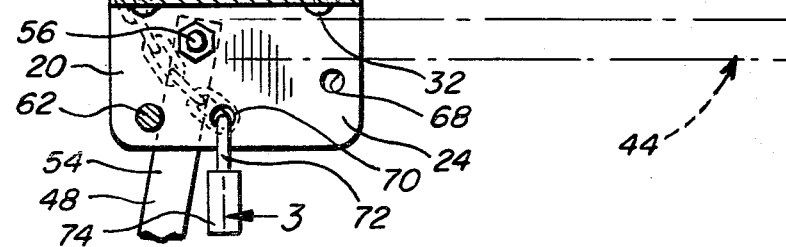

TRAILER TONGUE STAND

BACKGROUND OF THE INVENTION

Various forms of trailer tongue stands heretofore have been provided. However, most trailer tongue stands are vertically adjustable and are used primarily in conjunction with trailers which may experienced heavy tongue loadings. While these adjustable tongue stands function as desired and with high reliability, they are expensive and not required on trailers which do not experience high tongue loadings. Therefore, a need exists for a lightweight inexpensive trailer tongue stand which may be used, when desired, to support the tongue of a trailer in an elevated position above the ground.

Examples of various different forms of trailer tongue stands including some of the general structural and operational features of the instant invention are disclosed in U.S. Pat. Nos. 2,571,390, 2,631,862, 2,865,658, 2,969,885, 3,643,975, 3,791,676, 3,989,276, and 4,294,088.

BRIEF DESCRIPTION OF THE INVENTION

The trailer tongue stand of the instant invention is of lightweight construction and its major components may be readily constructed of channel members of different sizes and lengths. The trailer tongue stand incorporates a leg assembly swingable between a rearwardly projecting and horizontally disposed retracted position and a downwardly extended and slightly forwardly inclined extended position. The tongue stand may be readily operatively associated with trailer tongues of different cross sectional dimensionals and further includes structure defining a spare tire carrier as well as means by which the stand may be locked in either the downwardly extended or upwardly retracted positions and associated spare tire may be locked against unauthorized removal.

The main object of this invention is to provide a trailer tongue stand for lightweight trailers and which may be readily mounted upon trailer tongues of different cross sectional sizes.

Another object of this invention is to provide a lightweight trailer tongue stand for trailers which are not subject to heavy tongue loading.

A further object of this invention provide a trailer tongue stand also incorporating a spare tire mount.

Yet another important object of this invention is to provide a trailer tongue stand which may be constructed from readily available and inexpensive components.

A final object of this invention to be specifically enumerated herein is to provide a trailer tongue stand in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary perspective view of the forward tongue portion of a boat trailer and with the combined boat trailer stand and spare tire mount of the instant invention operatively associated with the tongue of the trailer;

FIG. 2 is a enlarged fragmentary vertical sectional view taken substantially upon the plane indicated by the section line 2—2 of FIG. 1;

FIG. 3 is a transverse vertical sectional view taken substantially upon the plane indicated by the section line 3—3 of FIG. 2; and FIG. 4 is a perspective view of the upper channel member of the combined trailer tongue stand and spare tire mount.

DETAILED DESCRIPTION OF THE INVENTION

Referring now more specifically to the drawings, the numeral 10 generally designates a boat trailer of conventional design including a forwardly projecting tongue 12 having a socket hitch assembly 14 mounted on its forward end.

The combined trailer tongue stand and spare tire mount assembly of the instant invention referred to in general by the reference numeral 16 and is mounted on the tongue 12 intermediate the socket hitch assembly 14 and the tongue mounted bow stop 18 of the trailer 10.

The assembly 16 includes a channel member 20 having depending first and second opposite side flanges 22 and 24 interconnected at their upper marginal edges by an upper bight portion 26. The bight portion 26 includes opposite side pairs of front and rear slots 28 and 30 formed therein and inverted carriage bolts 32 have their shank portions passed upwardly through the slots 28 and 30 and passed through similar pairs of opposite side front and rear slots 34 and 36 formed in the bight portion 38 of an upper upwardly opening channel member 40. The upper ends of the carriage bolts 32 are secured through the slots 34 and 36 by threaded nuts 42. The slots 28, 30, 34 and 36 extend transversely of the corresponding bight portions 26 and 38 and therefore enable the carriage bolts 32 to be spaced different distances apart in order to accommodate trailer tongues 12 of different widths therebetween.

A generally U-shaped leg assembly is provided and referred to in general by the reference numeral 44. The leg assembly 44 comprises an elongated channel member 46 which is bent into generally U-shaped configuration defining opposite side legs 48 and 50 interconnected at their lower ends by an integral horizontal cross piece or bight portion 52. The upper end portions 54 of the legs 48 and 50 are generally parallel and slightly angulated relative to the remaining downwardly divergent lower portions of the legs 48 and 50. A first pivot fastener 56 secures the upper end portion 54 of the leg 48 to an upper portion of the flange 24 and a second longer pivot fastener 58 pivotally secures the upper end portion 54 of the leg 50 to the upper portion of the flange 22. The pivot fastener 58 includes a compression spring 60 which serves to yieldingly bias the inner side of the upper end portion 54 toward the outer opposing surface of the flange 22 for a purpose to be hereinafter more fully set forth.

The forward lower corner portions of the flanges 22 and 24 have an abutment member 62 extending therebetween and secured therethrough and the opposite ends of the abutment member 62, which project outwardly of the flanges 22 and 24, are abuttable by the upper end portions 54 of the legs 48 and 50 to limit pivotal movement of the leg assembly 44 toward the downwardly projected and slightly forwarded inclined extended position thereof illustrated in FIG. 1. In addition, the flange 22 includes a pair of outwardly projecting integral detents 64 and one of the detents 64 is disposed immediately behind the upper end portion 54 when the leg assembly 44 is in the downwardly extended position thereof illustrated in FIG. 1 and the other detent is disposed immediately beneath the upper end portion 54 of the leg 50 when the leg assembly 44 is swung rearwardly and upwardly toward an upwardly retracted rearwardly projecting horizontal position. Thus, the detents 64 yieldingly retain the leg assembly 44 either in the downwardly projected position thereof illustrated in FIG. 1 or an upwardly retracted horizontal and rearwardly projected position closely underlying the tongue 12.

The flange 24 includes first and second bores 68 and 70 formed therethrough and it will be noted that the bore 70 is disposed immediately behind the upper end portion 54 of the leg 48 when the leg assembly 44 is downwardly extending position, see FIG. 2. Also, from the phantom line position of the leg assembly shown in FIG. 2, when the leg assembly is in the upwardly retracted position the bore 68 is disposed immediately beneath the upper end portion 54 of the leg 48.

The hasp 72 of a padlock 74 may be passed through the bore 68 in order to lock the leg assembly 44 in the raised position or through the bore 70 in order to lock the leg assembly 44 in the downwardly extended position. It is to be noted that the bores 68 and 70 are formed in the flange 24 while the spring biased pivot connection 50, 60 is operatively associated with the flange 22, the pivot fastener 56 not allowing lateral outward displacement of the upper end portion 54 of the leg 48 relative to the flange 24.

The central portion of the bight portion 38 includes a center longitudinally extending slot 76 formed therein and the lower end of an inverted carriage bolt 78 projects upwardly through the center slot 76. The head of the carriage bolt 78 is, of course, held captive between the bight portion 38 of the channel member 40 and the upper surface of the tongue 12, see FIG. 3.

A centrally apertured downwardly opening channel member or bar 80 is provided and upwardly receives the upper end of the carriage bolt 78 therethrough. The channel member 80 may be disposed across the centrally apertured hub portion 82 of a spare tire wheel 84 and channel member 80 may be tightly secured in position by a nut 86 threadedly engaged with the carriage bolt 78. In addition, one end of a link chain section 88 is anchored relative to the channel member 80 and the other end of the link chain section 88 is passed downwardly through the center of the wheel 84 and has the hasp 72 of the padlock 74 engaged therethrough. Even though a wrench may be engaged with the nut 86 to remove the same, the length of the link chain section 88, when one end thereof is anchored to the padlock hasp 72 in the manner illustrated in FIG. 3 of the drawings, is not sufficient to enable the channel member 80 to be passed upwardly off the upper end of the carriage bolt 78. Further, the nuts 42 which secure the carriage bolts 32 in position are maintained in a unaccessible position by the spare wheel 84. Accordingly, the padlock 74 not only serves to lock the leg assembly 44 in the downwardly extended position in the manner illustrated in FIG. 2 of the drawings but also to lock the spare wheel 54 against removal from the trailer tongue 12.

Of course, the hasp 72 of the padlock 74 may be passed through the bore 68 in order to lock the leg assembly 44 in the upper rearwardly projecting position. Here again, when the hasp 72 of the lock 74 is passed through the bore 68, the length of the link chain section 88 is not sufficient to enable the channel member 80 to be upwardly displaced from the upper end of the carriage bolt 78.

The leg assembly 44 is stiff and substantially rigid but may be flexed at least somewhat against the biasing action of the spring 66 in order to allow the upper end portion 54 of the leg 50 to pass over both of the detents 64 when the leg assembly 44 is swung either from the raised position to the fully downwardly extended position or from the fully donwardly extended position to the raised position. The detents 64 are formed in the flange 22 merely by outwardly deforming portions of the flange 22.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A trailer tongue stand including a downwardly opening inverted channel for mounting to the underside of a trailer tongue rearwardly of a hitch assembly carried by the front end of the tongue and with the channel extending longitudinally of the tongue, said channel including depending opposite side flanges interconnected along their upper marginal edges by a bight position extending therebetween, a generally U-shaped leg assembly including a pair of upright legs interconnected at their lower ends by a horizontal cross piece, first and second pivot means pivotally supporting the upper ends of first and second legs of said leg assembly from the exteriors of the upper portions of first and second side flanges of said channel, respectively, for angular displacement of said leg assembly relative to said channel about at least substantially aligned axes between an extended position with said leg assembly projecting downwardly from said channel and a retracted position with said leg assembly swung rearwardly and upwardly to a rearwardly projecting horizontally disposed position, stop means carried by said channel member and engageable by said leg assembly to limit swinging movement of said leg assembly toward said extended position, said first of said channel side flanges including a pair of outwardly projecting dimple means, said leg assembly being stiff but slightly resilient, said first pivot means including means allowing outward displacement of said first leg relative to said first side flange and means yieldingly biasing said first leg toward said first side flange, one of said dimple means being disposed immediately behind said one leg when said leg assembly is in said extended position and the other of said dimple means being disposed immediately beneath said one leg when said one leg assembly is in said retracted position.

2. The trailer tongue stand of claim 1 including lock means releasably engageable with said second side flange for selectively locking said leg assembly in said extended and retracted positions.

3. The trailer tongue stand of claim 1 wherein said leg assembly comprises an elongated channel member bent into substantially U-shaped configuration.

4. The trailer tongue stand of claim 1 including an upwardly opening channel member section for mounting to the upper side of a trailer tongue with said channel member section extending longitudinally of said tongue and disposed in vertical registry with said channel, opposite side marginal portions of said channel and channel member section having the opposite ends of upstanding threaded fasteners secured therethrough for clamping a trailer tongue between said channel member section and channel, said channel member section including a central aperture formed therethrough, a headed bolt passed upwardly through the central aperture in said channel member section, a centrally apertured horizontal cross bar telescoped downwardly over the upper end portion of said headed bolt and secured in position thereon by a holddown member threaded on the upper end of said bolt above said cross bar, said cross bar having one end of a length of link chain secured thereto, and lock means carried by the other end of said link chain section releasably lockably engageable with said channel, the length of said link chain section being insufficient to allow upward displacement of said cross bar from the upper end of said bolt.

5. In combination with a trailer including a forwardly projecting horizontal tongue, a trailer tongue stand including a downwardly opening inverted channel mounted to the underside of said trailer tongue and with said channel extending longitudinally of said tongue, said channel including depending opposite side flanges interconnected along their upper marginal edges by a bight portion extending therebetween, a generally U-shaped leg assembly including a pair of upright legs interconnected at their lower ends by a horizontal cross piece, first and second pivot means pivotally supporting the upper ends of first and second legs of said leg assembly from the exteriors of the upper portions of first and second side flanges of said channel, respectively, for angular displacement of said leg assembly relative to said channel about at least substantially aligned axes between an extended position with said leg assembly projecting downwardly from said channel and a retracted position with said leg assembly swung rearwardly and upwardly to a rearwardly projecting horizontally disposed position, stop means carried by said channel member and engageable by said leg assembly to limit swinging movement of said leg assembly toward said extended position, said first of said channel side flanges including a pair of outwardly projecting dimple means, said leg assembly being stiff but slightly resilient, said first pivot means including means allowing outward displacement of said first leg relative to said first side flange and means yieldingly biasing said first leg toward said first side flange, one of said dimple means being disposed immediately behind said one leg when said leg assembly is in said extended position and the other of said dimple means being disposed immediately beneath said one leg when said one leg assembly is in said retracted position.

6. The combination of claim 5 including lock means releasably engageable with said second side flange for selectively locking said leg assembly in said extended and retracted positions.

7. The combination of claim 6 wherein said leg assembly comprises an elongated channel member bent into substantially U-shaped configuration.

* * * * *